INVENTOR.
Wilbur E. Shearman

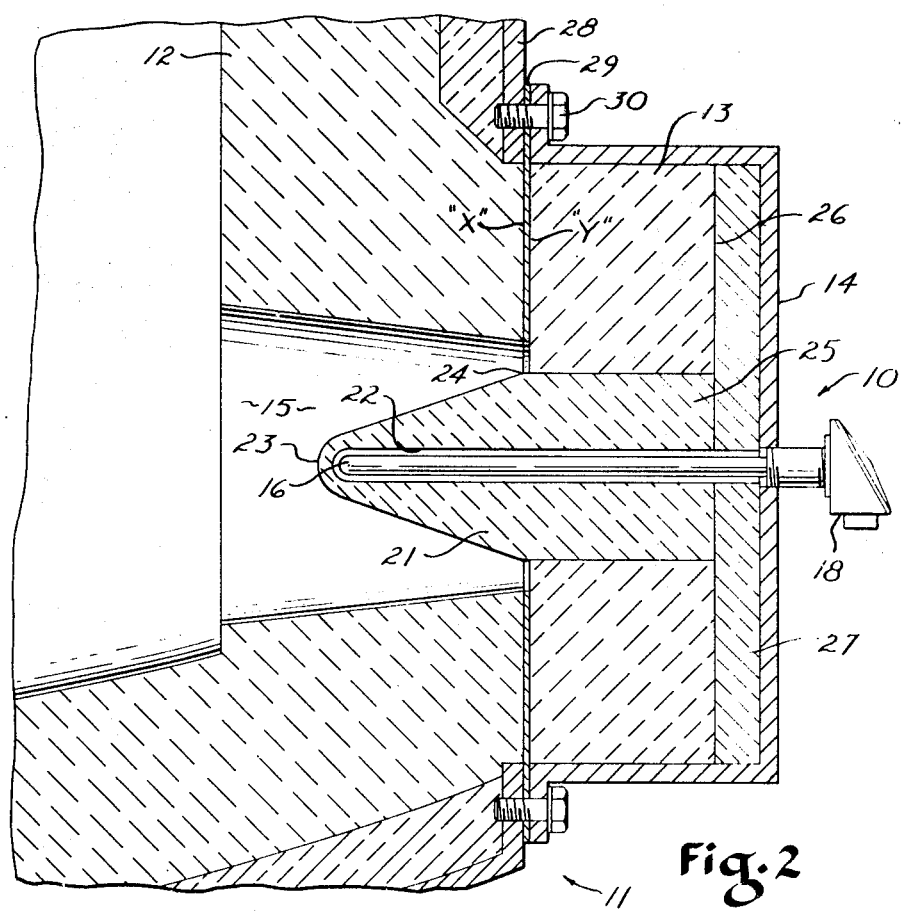
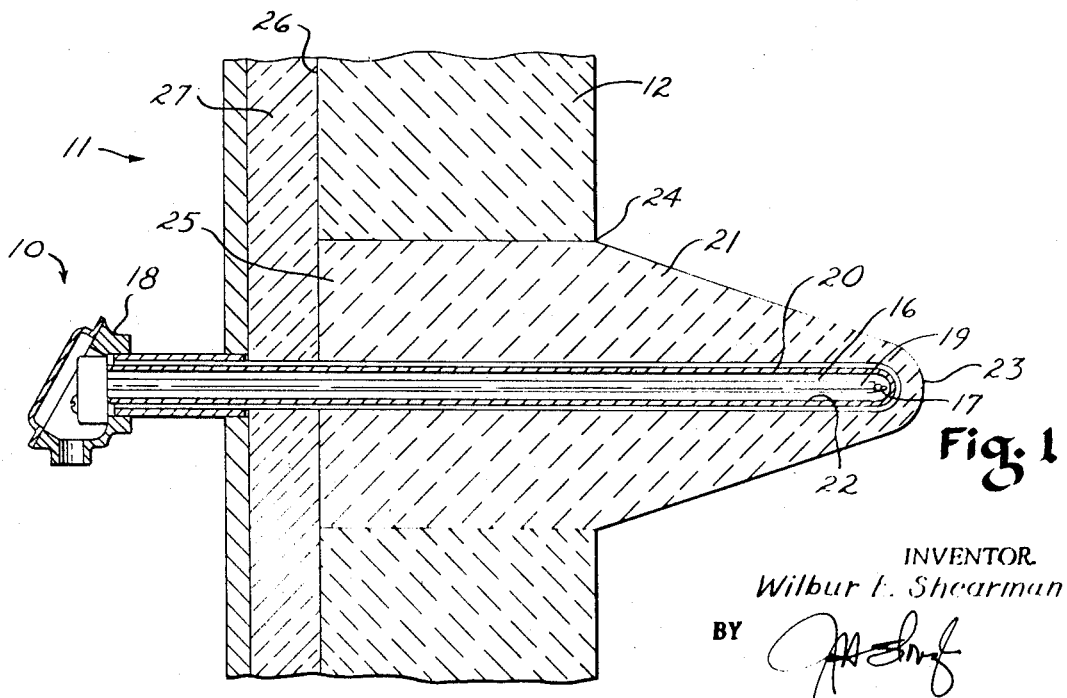
Fig. 2
Fig. 1

United States Patent Office 3,610,045
Patented Oct. 5, 1971

3,610,045
THERMOCOUPLES
Wilbur E. Shearman, Bazetta Township, Trumbull County, Ohio, assignor to Ajax Magnethermic Corporation, Warren, Ohio
Filed Apr. 1, 1965, Ser. No. 444,668
Int. Cl. H01r 1/02; G01k 1/14
U.S. Cl. 73—343                                2 Claims

ABSTRACT OF THE DISCLOSURE

A temperature measuring device particularly for a bath of molten iron. A thermocouple is disposed within a hollow ceramic refractory protective sheath placed in a wall of the furnace. The thickness of the sheath at its intersection with the surface furnace wall is greater than the thickness at the tip of the sheath which contains the thermocouple junction.

---

This invention relates to the indication, measurement, and control of the temperature in ferrous metal melting and particularly obtaining continuous temperature measurement in a bath of molten iron. Previous efforts of obtaining continuous temperature measuremenet in a bath of molten iron have been to a large degree unsuccessful, the indication means failing in a matter of hours or at most within a few days. As a consequence, there has been no practical means of continuously monitoring or controlling the tempertaure of furnaces containing molten iron; and the industry has been limited by being required to resort to spot checks with disposable thermocouples having an inherent life of from one to ten immersions in the molten metal of but ten seconds duration, and each such immersion requiring careful attention of the operator.

I have discovered that the use of a thermocouple disposed within a hollow ceramic refractory protective sheath having a portion thereof protruding within the melt and the wall thickness of said sheath being relatively thin at the tip, and of relatively greater wall thickness at the intersection of said sheath with the "hot face" of the furnace wall, said sheath being embedded into the furnace wall for a substantial length, provides a unit having a greatly increased life and a very accurate temperature measurement.

I have found further that a preferred form of said hollow ceramic refractory sheath for the thermocouple is that which is generally conical in form, at least in that portion of the sheath which projects into the melt with a concentric cylindrical bore. Other forms may be utilized as shown in the various modifications disclosed herein.

The present inventor, in an effort to develop a temperature sensing device for continuous operation in molten iron, attempted the use of protective tubes of uniform wall thickness throughout, such as shown, for instance, in Tama U.S. Patent No. 2,519,941 and Fischer U.S. Patent No. 3,091,119. Such tubes are widely used for continuous temperature sensing in nonferrous metal melting and are very satisfactory for that purpose, particularly if made of silicon carbide, a material with exceptionally high thermal stress resistance and thermal conductivity. Silicon carbide tubes, however, deteriorate very quickly in molten iron and have been found impractical for continuous use with that metal. Refractories which resist molten iron, such as high alumina, magnesite, or silica have inherently poor stress resistance and much lower thermal conductivity.

Five initial trials with high alumina protective tubes of heavy uniform wall thickness in molten iron resulted in an average life of twelve days at an average melt temperature of 2,550° F. Failure of the protective tube occurred near its intersection with the "hot face" of the furnace wall. At the same time, the speed of response of the temperature sensing device was inadequate for any temperature control purposes.

By contrast, two trials of a protective sheath of high alumina refractory, constructed in accordance with this invention, gave an average life of eighty-six days at an average temperature of 2,750° F. At the same time, the speed of response was doubled, thereby becoming adequate for most furnace control purposes. In judging the improvement obtained from the use of my invention according to these results, one must consider that deterioration of refractories increases rapidly with temperature and that the temperatures employed in the tests of the sheath of my invention were higher than those employed in the initial trials with tubes of uniform wall thickness described.

It is the primary object of this invention to provide temperature measurement means for ferrous metal melting furnaces which permit the continuous, exact, and reliable indication of the true melt temperature.

It is also an important object of the invention to provide reliable, continuous temperature measurement for the purpose of controlling the intensity of the heat source, thereby maintaining in the melt at all times a temperature close to the desired optimum.

It is also an important object of the invention to provide improved temperature sensing means wherein replacement of said sensing means occur rarely at widely spaced periods.

A further object of my invention is to provide the protective sheath of the thermocouple with sufficient strength and resistance to high temperatures and molten iron so as to prevent frequent breakdowns.

A still further object of this invention is to provide a device of the character described which will be sufficiently quick in its response and sensitive to changes in the melt temperature to control the operating temperature within close limits.

It is a further object of my invention to place the temperature sensing means within the furnace in contact with the melt therein and yet to protect the same from mechanical damage due to fresh charge material entering the melt.

It is a further object of my invention to provide a protected thermocouple unit easily removable and replaceable.

The invention is particularly adapted for use for ferrous material; and it will be observed that the melting of cast iron, for example, destroys normal thermocouple tubes.

My invention is disclosed in several modifications shown in the accompanying drawings:

FIG. 1 shows an embodiment of my invention in vertical sectional elevation of a portion of a melting furnace disclosing the improved sensing means of this invention installed therein.

FIG. 2 is a view similar to that of FIG. 1, disclosing a method of mounting the sensing means of my invention which permits quick replacement thereof and affords protection from mechanical damage.

3

Figure 3:
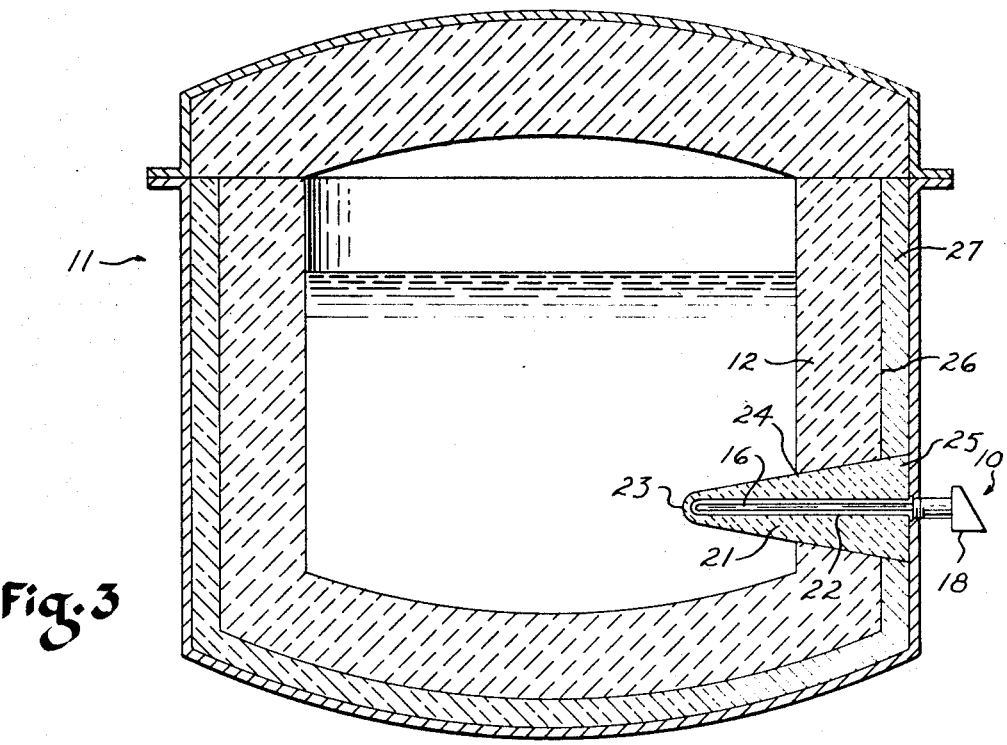

FIG. 3 is a view similar to that of FIG. 1 but disclosing further portions of a melting furnace therein, said view disclosing another embodiment of my invention.

Figure 4:
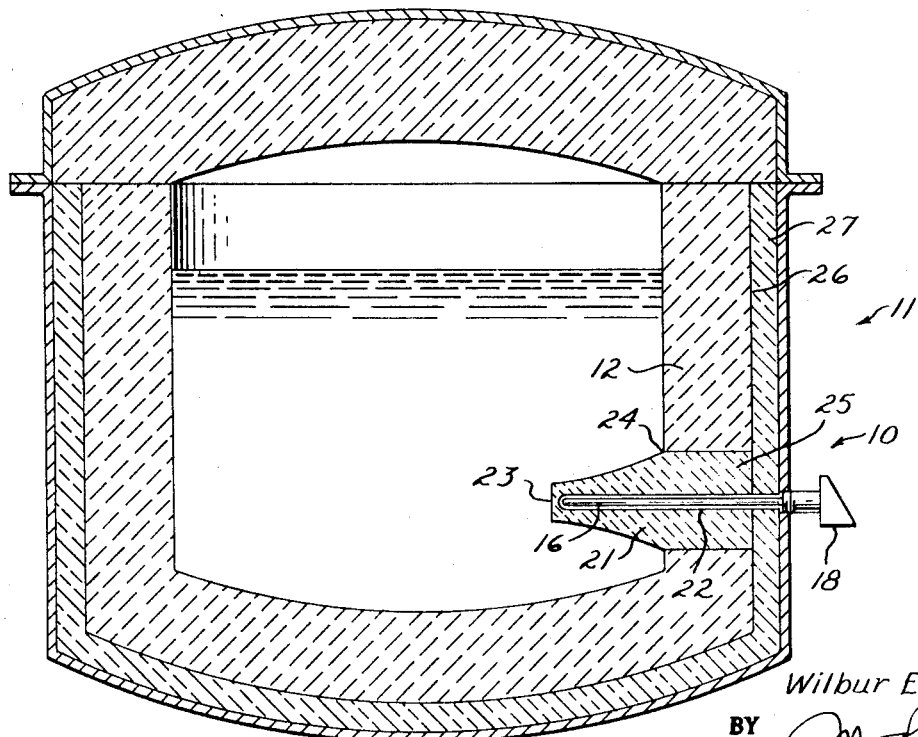

FIG. 4 is a view similar to that of FIG. 3, disclosing another embodiment of my invention.

Figure 5:
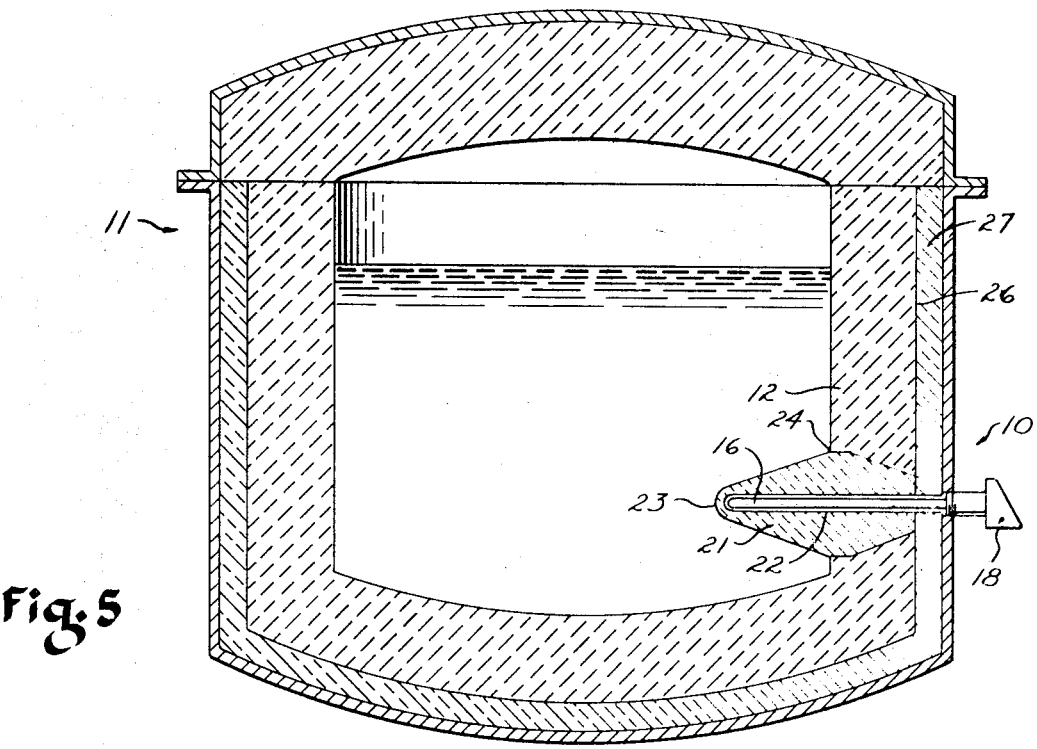

FIG. 5 is a view similar to that of FIG. 3, disclosing another embodiment of my invention.

Figure 6:
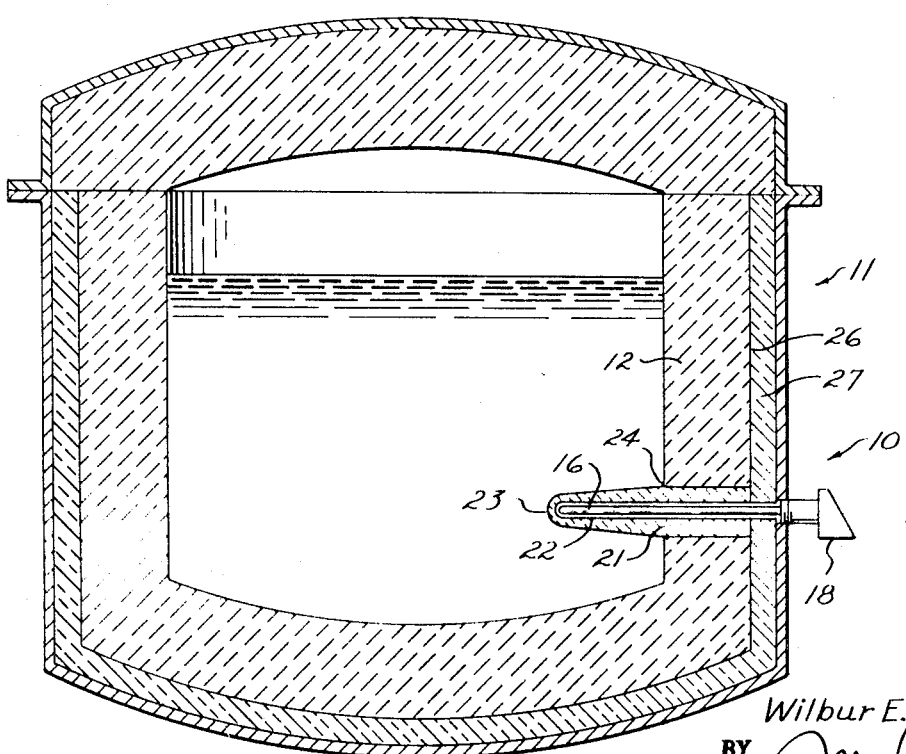

FIG. 6 is a view similar to that of FIG. 3, disclosing another embodiment of my invention.

Referring now to the drawings, in all of which like parts are designated by like reference characters, the improved temperature sensing means 10 of my invention whether the same be of any of the forms herein illustrated and described is adapted to be disposed within a melting furnace or container 11 adapted to hold ferrous metals at any desired heat, and is either disposed through the container or furnace wall 12, as best shown in FIGS. 3, 4, 5, 6 or through a wall 13 of a removable cover 14 sealing a recess or pocket 15 therein, as best illustrated in FIG. 2 herein. In either case a portion of the temperature sensing means is located in direct contact with the molten ferrous metal in the container.

The temperature sensing means 10 of my invention preferably comprises a thermocouple 16 composed of two conductors of dissimilar metal in a manner well known to the art, the same uniting to for a hot junction 17 at one end and connected at their opposite ends to the usual terminals provided in the thermocouple head 18. A multiple bore ceramic insulator 19 supports and spaces said conductors. The conductors are preferably encased in a tube 20 preferably formed of alumina, porcelain, ceramic, or the like, as best disclosed in FIG. 1.

Enclosing the said tube encased thermocouple, in each of the modifications, is an outer sheath 21 of ceramic refractory composition mounted in the wall 12 of the furnace or container or of the sealing cover 14 for the pocket or recess 15 therein; and said sheath 21 is provided with a cylindrical bore 22 therein. The said sheath 21 is formed with a tip portion 23 of least wall thickness, said tip being relatively thin, as shown, and with a portion 24 contiguous the point of intersection with the "hot face" of the said wall of relatively greater wall thickness than the tip, wherefor the sensing of the temperature of the melt is accurate and immediate, but "cracking" or deterioration of the sheath and thermocouple is overcome.

When using a platinum rhodium thermocouple, I have found it is advantageous to apply slight air pressure to the inside of the inner tube 20 to prevent, in a known manner, loss of themocouple accuracy due to contamination with furnace gases. Similarly, other gases may be used to adequately protect different high temperature thermocouple materials.

The term "hot face" as used throughout this specification refers to the inner surface of the furnace refractory wall in the vicinity of the temperature sensing device, i.e. the wall surface which during normal operation is contacted by the molten metal.

The said outer protective sheath 21 is preferably of conical form and of gradually increasing cross-sectional depth from the rounded tip end 23 thereof to its intersection with the "hot face"; and said outer sheath is preferably of one-piece construction, as illustrated in the figures herein; and the body portion 25 of the sheath 21 extends into the wall a substantial extent beyond the said intersection with the "hot face," as shown.

While a cone shape is preferably employed, as disclosed in FIGS. 1, 2, 3, 5, and 6, for that portion of the sheath protruding within the molten ferrous material in the furnace or recess thereof, it will be understood that a concave form might be employed, as disclosed in FIG. 4, or a convex or pyramidal shape, not shown, and that the terminal body portion 25 may be of uniform cross-sectional width throughout, as disclosed in FIGS. 1, 2, 4, 6, or of gradually increasing diameter, as shown in FIG. 3, or of gradually decreasing cross-section or diameter, as shown in FIG. 5, and that such portion 25 may be of other varying cross-section. It is preferred in any case that the ceramic sheath 21 be embedded into the furnace 12 or recess wall 13 for a substantial distance beyond the "hot face" thereof. The sheath as illustrated herein is formed of ceramic refractory in one piece.

In all forms of this invention, howsoever constructed, the ceramic sheath 21 affording a tubular conduit for the thermocouple or the like is provided with a melt projecting portion (whether this be disposed within the container or furnace hearth or in a recess therein containing molten ferrous material) which has a tip of relatively thin wall thickness, and said thermocouple conduit is provided with a portion of substantially greater wall thickness at the intersection of the same with the "hot face" of the furnace wall or wall of the pocket, a body portion thereof being embedded further a substantial distance in either of said walls.

In the forms illustrated in FIGS. 1, 2, 4, 5, and 6, the body portion 25 terminates at the interface 26 of the "hot face" refractory and the back up insulation 27 in a typical furnace wall and in the form illustrated in FIG. 3 terminates adjacent the furnace casing 28. One form or the other may be preferred, depending on the temperature gradients desired within the protective sheath.

In the form of FIG. 2 wherein the thermocouple is shown located within a pocket or tunnel 15 formed in the furnace wall 12, protection is afforded by such location from mechanical damage due to charging and deposition of heavy solid material into the melt. Furthermore, removal and replacement of the temperature sensing means can be effected by detaching the cover 14 from the furnace or container casing 28.

It will be noted that, in the embodiment shown in FIG. 2, the entire thermocouple tube enclosed assembly can be readily and quickly removed and replaced by simple separation of two substantially plane refractory surfaces x and y. As shown in FIG. 2, a sealing gasket 29 is disposed between said surfaces, and bolts 30 or other securing means disposed through aligned openings in the cover casing and the furnace casing secure the cover to the furnace. Simple removal thereof permits removal of the cover and its integrally associated thermocouple tube enclosed assembly.

The preferred ceramic refractory material for the sheath 21 is a high alumina refractory; and as an example thereof, a refractory composed of alumina and silica in the range of 75 to 99.5 percent alumina has been found highly satisfactory.

Although I have described my invention in connection with preferred embodiments hereof, I am, of course, aware that numerous and extensive departures may be made therein without, however, departing from the spirit of my invention and the scope of the appended claims.

What I claim is:

1. A ceramic refractory protective sheath for temperature sensing means adapted to be inserted in a ferrous metal melt in a container, said sheath having a first portion disposed within a wall of said container and a second portion projecting beyond the "hot face" of said wall into the melt, said second portion having a substantially lesser wall thickness at its tip than at its intersection with said "hot face," said sheath being of gradually increasing diameter from the tip to portions thereof intersecting the said wall and of gradually decreasing diameter from said intersecting portions of the sheath to the end of the sheath opposite said tip.

2. A cover for a ferrous melt container having a tunnel in the wall thereof, a ceramic refractory protective sheath encasing a temperature sensing device having a portion adapted to be inserted within said melt, said portion being disposed entirely within and surrounded by said tunnel, said sheath encased temperature sensing device being mounted on said cover and closing said tunnel and the portion of said sheath inserted with the melt being of substantially lesser wall thickness at its tip than at its intersection with the cover.

References Cited

UNITED STATES PATENTS

| | | | |
|---|---|---|---|
| 2,135,720 | 11/1938 | Krieg | 136—242 |
| 2,368,937 | 2/1945 | McGillin | 73—359 |
| 2,382,888 | 8/1945 | Levy | 136—242 |
| 3,091,119 | 5/1963 | Fischer et al. | 73—343 |
| 3,188,866 | 6/1965 | Mayer | 73—359 |

LOUIS R. PRINCE, Primary Examiner

D. E. CORR, Assistant Examiner

U.S. Cl. X.R.

73—359; 136—234, 242